United States Patent Office 3,479,443
Patented Nov. 18, 1969

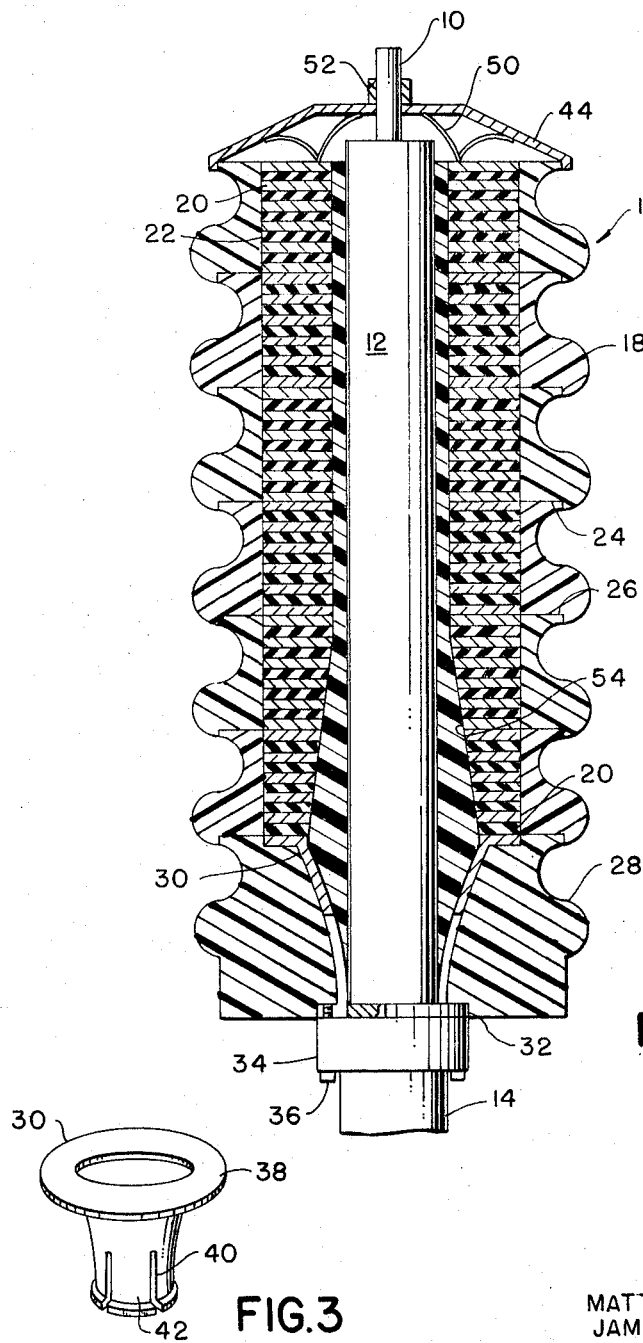

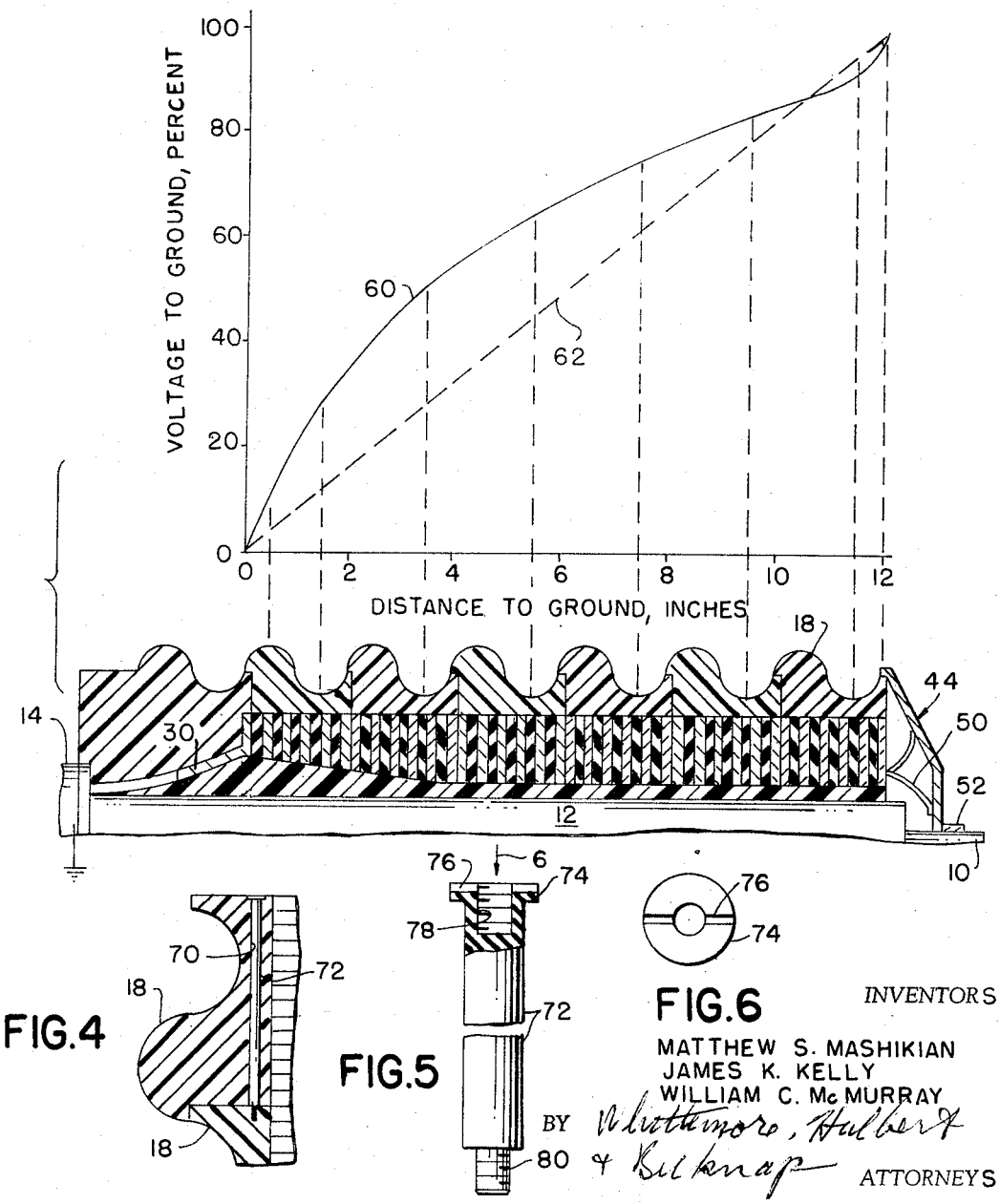

3,479,443
CAPACITIVELY GRADED MODULAR POTHEAD FOR H–V CABLE
Matthew S. Mashikian, Ann Arbor, James K. Kelley, Carleton, and William C. McMurray, St. Clair Shores, Mich., assignors to The Detroit Edison Company, Detroit, Mich., a corporation of New York
Filed May 9, 1968, Ser. No. 727,946
Int. Cl. H02g 3/06, 15/02
U.S. Cl. 174—73                                17 Claims

ABSTRACT OF THE DISCLOSURE

A pothead is assembled from modules each comprising an annular insulator body having tightly packed therein a multiplicity of flat alternately conducting and insulating rings. A stress cone connects the metal ring at one end of the pothead to a conducting sheath on the cable and a metal cap connects the conducting ring or washer at the other end to the bared conductor of the H–V cable.

Field of the invention

The term "pothead" is an abbreviation for "potential head," which is a construction provided at the end of an insulated high tension cable to bring about a desired potential gradient from the base conductor to the metal sheath which is normally cut back a substantial distance from the bared ends of the insulated cable. The insulation remains on the conductor intermediate the bared end of the conductor and the end of the grounded metal sheath. The present invention protects the insulation from stress concentrations which would otherwise occur and which might result in rupture of the insulation.

Summary of the invention

The construction comprises essentially a plurality of modules each of which comprises an annular insulator body in which is assembled a multiplicity of alternated conducting and insulating rings or washers. The ring at each end of each of the modules is a metal ring and the metal rings at the ends of adjacent modules are in surface to surface contact when the modules are assembled. The insulator bodies are shaped at their ends to interfit so as to provide a solid rigid construction.

At one end of the pothead there is provided an insulator body containing a metal stress cone, one end of which is in contact with the cable sheath and the other end of which makes electrical contact with the metal ring at the adjacent end of the adjacent module.

The alternated metal and insulating rings constitute a series of condensers which are adapted to produce a desired gradient in the field potential from end to end of the pothead.

It is accordingly an object of the present invention to provide a pothead comprising a plurality of modules each of which comprises an annular insulator body and a multiplicity of alternated metallic conducting and insulating rings or washers therein.

Other objects and features of the invention will become apparent as the description proceeds, especially when taken in conjunction with the accompanying drawings, illustrating a preferred embodiment of the invention.

Brief description of the drawings

FIGURE 1 is a longitudinal sectional view through a pothead constructed in accordance with the present invention.

FIGURE 2 is a composite view showing the voltage distribution resulting from the use of the pothead.

FIGURE 3 is a perspective view of a stress cone used in the construction.

FIGURE 4 is a fragmentary sectional view illustrating the means for directly attaching adjacent modules together.

FIGURE 5 is an enlarged view of the connecting element.

FIGURE 6 is a plan view looking in the direction of the arrow 6, FIGURE 5.

Description of the preferred embodiment

Referring first to FIGURE 1, the pothead is applied at the end of a H–V cable, the cable comprising a metal conductor 10, an insulating sheath 12, and a metallic conducting sheath 14 which may for example, be a lead sheath. The lead sheath is stripped from the cable to expose the intermediate portion of the insulating sheath, and the insulating sheath is stripped from the end of the conductor to expose the bared end indicated at 10. In order to provide for a desired voltage gradient from the high voltage at the bared end of the cable 10 and the ground potential existing at the end of the conducting sheath 14, the portion of the H–V cable carrying the exposed conducting sheath 12 is received in the pothead illustrated generally at 16.

The pothead comprises a multiplicity of modules each of which comprises an annular insulator body 18 and each containing a multiplicity of alternated metallic electrically conducting rings or washers 20 and insulating rings or washers 22. These washers are tightly packed and while a relatively small number is illustrated in FIGURE 1 for clarity, it is anticipated that approximately twenty-one will be provided in each module.

Preferably, the washers at each end of each module are metal so that when a plurality of modules are assembled in axially aligned abutment, metal conducting washers at adjacent ends of the modules are in engagement.

The ends of the insulator bodies are suitably shaped to provide an interfitting relation. For example, one end of each module may be recessed as indicated at 24 and the adjacent end of the adjacent module may be reduced as indicated at 26 so as to fit snugly within the recess 24.

In assembly the pothead is clamped to the cable end. For this purpose an annular insulator body 28 is provided which receives a metal stress cone 30 shown in perspective in FIGURE 3, and includes a ring 32 embedded in the insulator 28 and adapted to be attached to a clamping ring 34 which engages the end of the metal sheath 14 on the cable. The rings 32 and 34 may be attached together by suitable means such for example as screws 36.

The stress cone 30, which may be formed of aluminum, has an annular flange 38 adapted to have surface engagement with the lowermost metal ring or washer 20 in the next adjacent module and is further slotted as indicated at 40 to provide a plurality of tongues 42.

At the opposite end of the pothead there is provided a metal cap 44 dished as illustrated in FIGURE 1 to provide space between itself and the end conducting washer 20. A spring 50 is received in this space to assure good electrical connection between the cap 44 and the outer metal ring or washer 20. A clamp 52 is provided on the bared end of the conductor 10 of the cable and the entire assembly is retained in tightly engaged relationship between the clamps 52 and 34.

Preferably, the metal and conducting washers at the inner end of the pothead are cut away to provide a conical surface 54 as illustrated in the figure, to provide a compromise between the ideal longitudinal potential gradient and a reduced radial electric stress.

Referring now to FIGURE 2 there is illustrated the voltage distribution resulting from use of the pothead disclosed herein.

It will be observed that zero or ground potential exists at the outer end of the stress cone 30, due to its direct connection to the grounded cable sheath as previously described. On the other hand, maximum voltage exists at the outer end of the pothead and specifically, back as far as the inner end of the cap 44 which is in electrical contact with the bared end of the conductor 10 of the cable.

It will be understood that the alternated metal and insulating rings or washers constitute a multiplicity of series connected condensers which have the property of dividing the overall voltage therebetween as is well understood. Accordingly, the field voltage from end to end of the pothead falls along the full line designated 60, and it will be observed that while this is not a straight line, it nevertheless approximates the ideal uniform gradient indicated by the dotted line 62. The result is that the voltage is reduced from the high voltage of the conductor to ground in a controlled manner which eliminates field concentration with resultant stresses which might damage or destroy the insulation.

In use the space between the outer surface of the insulating sheath 12 of the cable and the inner surface of the openings in the alternated rings or washers 20 and 22 is filled with a suitable resin such as epoxy, urethane, silicone, polyethylene, or the like. These resins, either thermosetting or thermoplastic, are flowed into the space within the pothead and then are cured.

It is within the contemplation of the present invention to provide means for effecting a positive interlock and more particularly, firm contact between the ends of adjacent modules, and more particularly, between the metal rings 20.

As best seen in FIGURES 4, 5 and 6 the insulator body 18 of each module is provided with a plurality of openings 70 through which extend elongated fastener elements 72 which are formed of insulating material. Each fastener element 72 has a head 74 slotted as indicated at 76 for coaction with a screwdriver. The headed end of the fastener element is recessed as indicated at 78 and is provided with female threads. The opposite end of the element 72 is reduced and is provided with a short externally threaded projection 80. The fastener element is dimensioned so that the threaded projection 80 extends beyond one surface of the insulator body 18. Accordingly, a pair of adjacent insulator bodies 18 may be fastened together by screwing the threaded end of the elongated fastener elements in one module into the internally threaded recess 78 provided at the headed end of the elongated fastener elements in the adjacent module.

The material of which the insulator bodies 18 are formed may, with the construction shown, be a relatively inexpensive track resistant polymeric material made from silicone, epoxy, or olefin type resins. This is an important advantage since it eliminates the necessity for forming the outer insulation of porcelain or an equivalent material.

The pothead disclosed herein is intended for use with H-V cables rated 40 kv. and higher, although it will be useful with cables operated at somewhat lower voltage. The pothead has been used on polyethylene-insulated cables but is equally applicable for other types of cables; namely, P&L (paper and lead).

The pothead disclosed herein provides a better control of voltage distribution than has heretofore been available. As a result of this the pothead may be considerably shorter than potheads of previously known construction.

The present design provides a voltage distribution along the pothead which will be affected to a lesser degree by atmospheric conditions than has heretofore been possible. The pothead has improved performance on impulse voltage.

The present pothead is more economical than potheads of previous construction. This is due to the use of relatively inexpensive materials and the possibility of mass production of the modules in the factory through automated assembly lines. Moreover, the amount of field work is minimized, thus resulting in lower labor cost.

Ease of assembly in the field and a minimum amount of skill are required. This contributes to the further advantage of minimizing the risk of failure due to poor workmanship.

The elimination of porcelain, which in the present pothead is replaced by track resistance polymers, represents a further economy. In addition, it makes the pothead less fragile and easier to obtain since it eliminates difficulties resulting from the lack of ready availability of porcelain.

A very important further advantage results in the module construction since smaller and identical modules may be manufactured and stocked. The length of the potheads can be tailored in the field to suit each particular application.

What we claim as our invention is:

1. A pothead for controlling the potential gradient along a H-V cable comprising a series of generally annular modules fitted together in axial alignment, each of said modules comprising an annular insulator body formed of a track resistant electrically insulating resin and a plurality of alternated electrically conducting and non-conducting washers in said body assembled in tightly packed surface-to-surface contact with each other and with the inside surface of said annular insulator body.

2. A pothead as defined in claim 1 in which the end washers in each module are electrically conducting washers, and in which the end washers of adjacent modules are in surface contact with each other.

3. A pothead as defined in claim 1 in which the ends of said insulator bodies are shaped to interfit with each other.

4. A pothead as defined in claim 1, said pothead at its inner end having an annular body having therein a metal stress cone provided at its outer end with contact means engageable with the sheath of a H-V cable and engaged at the other end with the conducting washer at the adjacent end of the adjacent module.

5. A pothead as defined in claim 4, a metal cap at the outer end of said pothead, a clamp engageable with the bared conductor of the H-V cable beyond said cap, and means providing good electrical connection between said cap and the conducting washer at the end of the module at the outer end of said pothead.

6. A pothead as defined in claim 4, the modules having a central opening sufficiently larger than the insulated cable so as to provide a space therebetween, and potting compound filling said space.

7. A pothead as defined in claim 1, in which said annular insulator bodies are formed of a track resistant polymeric material.

8. A pothead as defined in claim 1 in which said annular insulator bodies are formed of a silicone, epoxy, or olefin resin type material.

9. A pothead as defined in claim 1, and interlocking means connecting adjacent ends of adjacent modules together.

10. A pothead as defined in claim 9 in which said interlocking means comprises elongated interlocking insulating fastening elements extending through said modules.

11. A pothead as defined in claim 10 in which said elements have cooperating male and female threads at opposite ends thereof.

12. A sheathed cable end including a pothead comprising a tubular construction comprising a plurality of annular modules assembled in axially aligned abutment, each module comprising an annular insulator body having a series of alternated conducting and insulating flat rings assembled therein and in contact with the interior surface thereof, a metal stress cone having one end electrically connected to the sheath of said cable at the inner end of said construction and in electrical contact with a conducting ring at the end of the rings in the adjacent module, a metal cap at the other end of said construction having electrical contact with a contacting ring at the other end of said construction and in conducting relation to the bared end of the conductor in said cable.

13. A cable end as defined in claim 12 in which the portion of said cable within said construction has the conducting sheath removed therefrom, and in which the space between the insulated cable and the rings is filled with potting compound.

14. A module for use in assembly of a pothead comprising an annular body formed of a track resistant electrically insulating resin, said body containing therein a plurality of alternated electrically conductive and nonconductive washers assembled together in tightly packed surface-to-surface contact with each other and with the inside surface of said annular body.

15. A module as defined in claim 14 in which the washers at the ends of the module are metallic electrically conducting washers.

16. A module as defined in claim 15 in which the ends of the annular body are shaped to interfit with an end of an identical module to facilitate assembly of modules into an elongated construction.

17. A module as defined in claim 16 and in which the end conducting washers are disposed so as to make electrical contact with an end conducting washer in an identical module when assembled therewith.

References Cited

UNITED STATES PATENTS

| | | | |
|---|---|---|---|
| 1,259,386 | 3/1918 | Fortescue | 174—143 |
| 1,474,256 | 11/1923 | Goddard | 174—209 X |
| 2,068,624 | 1/1937 | Atkinson | 174—73 |
| 2,071,102 | 2/1937 | Atkinson | 174—73 |

FOREIGN PATENTS

| | | |
|---|---|---|
| 559,581 | 7/1958 | Canada. |
| 26,794 | 1/1964 | Germany. |
| 335,221 | 9/1930 | Great Britain. |

LARAMIE E. ASKIN, Primary Examiner

U.S. Cl. X.R.

174—80